United States Patent
Carrigan et al.

(10) Patent No.: US 9,002,941 B2
(45) Date of Patent: Apr. 7, 2015

(54) DETERMINING RECOMMENDED RECIPIENTS OF A COMMUNICATION

(75) Inventors: Wayne K. Carrigan, Chatfield, MN (US); Rafal P. Konik, Oronoco, MN (US); Timothy J. Massaro, Mazeppa, MN (US); Allen J. Ziolkowski, Rochester, MN (US)

(73) Assignee: International Business Machines Corporation, Amonk, NY (US)

( * ) Notice: Subject to any disclaimer, the term of this patent is extended or adjusted under 35 U.S.C. 154(b) by 274 days.

(21) Appl. No.: 13/605,454

(22) Filed: Sep. 6, 2012

(65) Prior Publication Data

US 2014/0067942 A1 Mar. 6, 2014

(51) Int. Cl.
*G06F 15/16* (2006.01)
*H04L 12/58* (2006.01)
*G06Q 10/10* (2012.01)

(52) U.S. Cl.
CPC .............. *H04L 51/14* (2013.01); *G06Q 10/107* (2013.01)

(58) Field of Classification Search
USPC ........................................................ 709/204
See application file for complete search history.

(56) References Cited

U.S. PATENT DOCUMENTS

| 6,134,566 | A | 10/2000 | Berman et al. | |
| 8,312,089 | B2 * | 11/2012 | Deluca et al. | 709/206 |
| 2004/0176072 | A1 | 9/2004 | Gellens | |
| 2006/0277207 | A1 | 12/2006 | Ure | |
| 2007/0005970 | A1 | 1/2007 | Trupp et al. | |
| 2009/0248551 | A1 * | 10/2009 | Taylor et al. | 705/32 |
| 2011/0087744 | A1 * | 4/2011 | Deluca et al. | 709/206 |
| 2011/0125857 | A1 * | 5/2011 | Shiga et al. | 709/206 |
| 2011/0213657 | A1 * | 9/2011 | O'Malley et al. | 705/14.49 |

OTHER PUBLICATIONS

Change Management Toolbook, "Analysis of an Organization's Learning Climate", Change Source Ltd, Johannesburg, South Africa. http://www.change-management-toolbook.com/mod/book/view.php?id=74&chapterid=20.
Email Address Checker, Rolosoft, © Copyright 2006-2012 email-checker.com, eVerify Ltd., London, England. http://tools.email-checker.com/.

* cited by examiner

*Primary Examiner* — Hua Fan
(74) *Attorney, Agent, or Firm* — Kevin D. Kehe; James R. Nock

(57) ABSTRACT

Embodiments of the invention include a method for determining recommended recipients of a communication. The method may include determining one or more attributes for one or more members of a first group. The method may also include receiving a first list of one or more recipients to receive a communication from a sender, wherein the recipients and the sender have a relationship based on the attributes. The method may also include determining a second list of one or more recipients to receive the communication, wherein the recipients of the second list are determined by whether the attributes of the first list recipients, the sender, and the first group members comply with a set of communication rules.

18 Claims, 5 Drawing Sheets

PERSONNEL DATA TABLE (132)

| | NAME (224) | EMAIL (226) | TITLE (228) | REPORT TO CHAIN (230) | SAME MANAGER (232) | EXTENDED RELATION (234) | PEOPLE MANAGED (236) | GROUPS (238) | CERTIFICATIONS (240) |
|---|---|---|---|---|---|---|---|---|---|
| 202 | A | A@US.COM | PRESIDENT | | | | B,C,D | | |
| 204 | B | B@US.COM | MANAGER | A | C,D | D | E,F | | ITAR |
| 206 | C | C@US.COM | MANAGER | A | B,D | | G,H | | ITAR, LEGAL |
| 208 | D | D@US.COM | MANAGER | A | B,C | B | I,J,K | | |
| 210 | E | E@US.COM | ENGINEER | B,A | F | K | | POWER | ITAR |
| 212 | F | F@US.COM | ENGINEER | B,A | E | | | | ITAR, LEGAL |
| 214 | G | G@US.COM | ATTORNEY | C,A | H | | | | ITAR, LEGAL |
| 216 | H | H@US.COM | ATTORNEY | C,A | G | | | | ITAR |
| 218 | I | I@US.COM | ENGINEER | D,A | J,K | | | | |
| 220 | J | J@US.COM | ENGINEER | D,A | I,K | | | POWER | |
| 222 | K | K@US.COM | ENGINEER | D,A | I,J | E | | POWER | |

FIG. 2

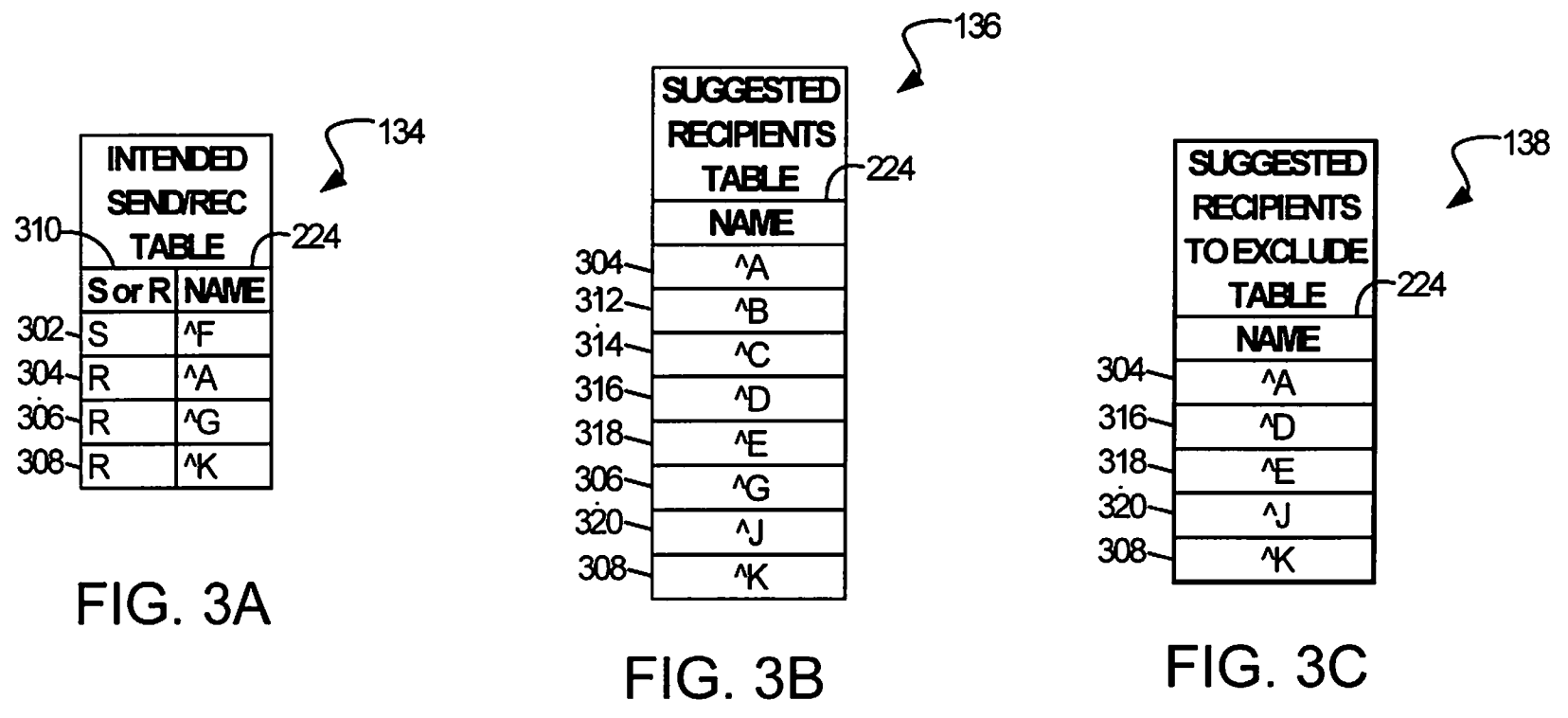

| INTENDED SEND/REC TABLE | 224 |
|---|---|
| S or R | NAME |
| S | ^F |
| R | ^A |
| R | ^G |
| R | ^K |

FIG. 3A

| SUGGESTED RECIPIENTS TABLE | 224 |
|---|---|
| NAME | |
| ^A | |
| ^B | |
| ^C | |
| ^D | |
| ^E | |
| ^G | |
| ^J | |
| ^K | |

FIG. 3B

| SUGGESTED RECIPIENTS TO EXCLUDE TABLE | 224 |
|---|---|
| NAME | |
| ^A | |
| ^D | |
| ^E | |
| ^J | |
| ^K | |

FIG. 3C

DETERMINING RECOMMENDED RECIPIENTS OF A COMMUNICATION

TECHNICAL FIELD

The field of the invention relates to electronic communication, and more specifically, to providing a sender of an electronic communication with information to determine recommended recipients.

BACKGROUND

Computer systems typically include a combination of computer programs and hardware, such as semiconductors, transistors, chips, circuit boards, storage devices, and processors. The computer programs are stored in the storage devices and are executed by the processors. A common feature of many computer systems is the ability to send communication between users. This communication may be in the form of an email or any other similar form of communication.

SUMMARY

Embodiments of the invention include a method for determining recommended recipients of a communication. The method may include determining one or more attributes for one or more members of a first group. The method may also include receiving a first list of one or more recipients to receive a communication from a sender, wherein the recipients and the sender have a relationship based on the attributes. The method may also include determining a second list of one or more recipients to receive the communication, wherein the recipients of the second list are determined by whether the attributes of the first list recipients, the sender, and the first group members comply with a set of communication rules.

Other embodiments of the invention include a method for directing an email communication to recipients. The method may include determining one or more attributes for one or more members of a first group. The method may also include determining one or more attributes for one or more members of a second group. The method may also include receiving a first list of one or more recipients to receive a communication from a sender, wherein the recipients and the sender have a relationship based on the attributes. The method may also include analyzing the content of the communication. The method may also include determining a second list of one or more recipients to receive the communication, wherein the recipients of the second list are determined by whether the attributes of the first list recipients, the sender, and the first group members comply with a set of communication rules

BRIEF DESCRIPTION OF THE SEVERAL VIEWS OF THE DRAWINGS

FIG. 2 depicts a block diagram of an example data structure for a personnel data table, according to an embodiment of the invention.

FIG. 3A depicts a block diagram of an example data structure for a received sender/recipients table, according to an embodiment of the invention.

FIG. 3B depicts a block diagram of an example data structure for a suggested recipients table, according to an embodiment of the invention.

FIG. 3C depicts a block diagram of an example data structure for a suggested recipients to exclude table, according to an embodiment of the invention.

In the drawings and the Detailed Description, like numbers generally refer to like components, parts, steps, and processes.

DETAILED DESCRIPTION

Today's electronic devices provide users with tools to accomplish many tasks. One of those tasks may be sending communication between users in the form of email, text messages, instant messages, or any other similar communication. The prevalence of email in business has increased to the point where it may be the preferred form of communication between employees. That prevalence creates a large volume of communications which may have an equally large variety of content and intended recipients. This may create an increased chance of sending a communication to an unintended recipient. The consequences of which may range from annoying coworkers to sending sensitive information to people not authorized to receive it.

Embodiments of the invention provide an automated process by which the recommended recipients of a communication are determined by analyzing the content of the communication and the organizational attributes of potential recipients of that communication. This determination may be accomplished by utilizing information from organizational sources, such as organizational chart databases or human resource databases, and applying communication rules to the information to determine which recipients should receive a communication. For example, one communication rule may be that an email should not be sent to the manager of the sender's manager unless it is also sent to the sender's manager. If a sender attempts to send an email to the manager of the sender's manager without including the sender's manager as a recipient, embodiments of the invention may automatically alert the sender of the exclusion of the sender's manager as a recipient. In other embodiments, a wide range of organization information from multiple sources and multiple companies may be used to determine recommended recipients. The use of this information may provide a wide variety of relational attributes by which embodiments of the invention may provide a process for determining the recommended recipients of a communication.

Figure 1:
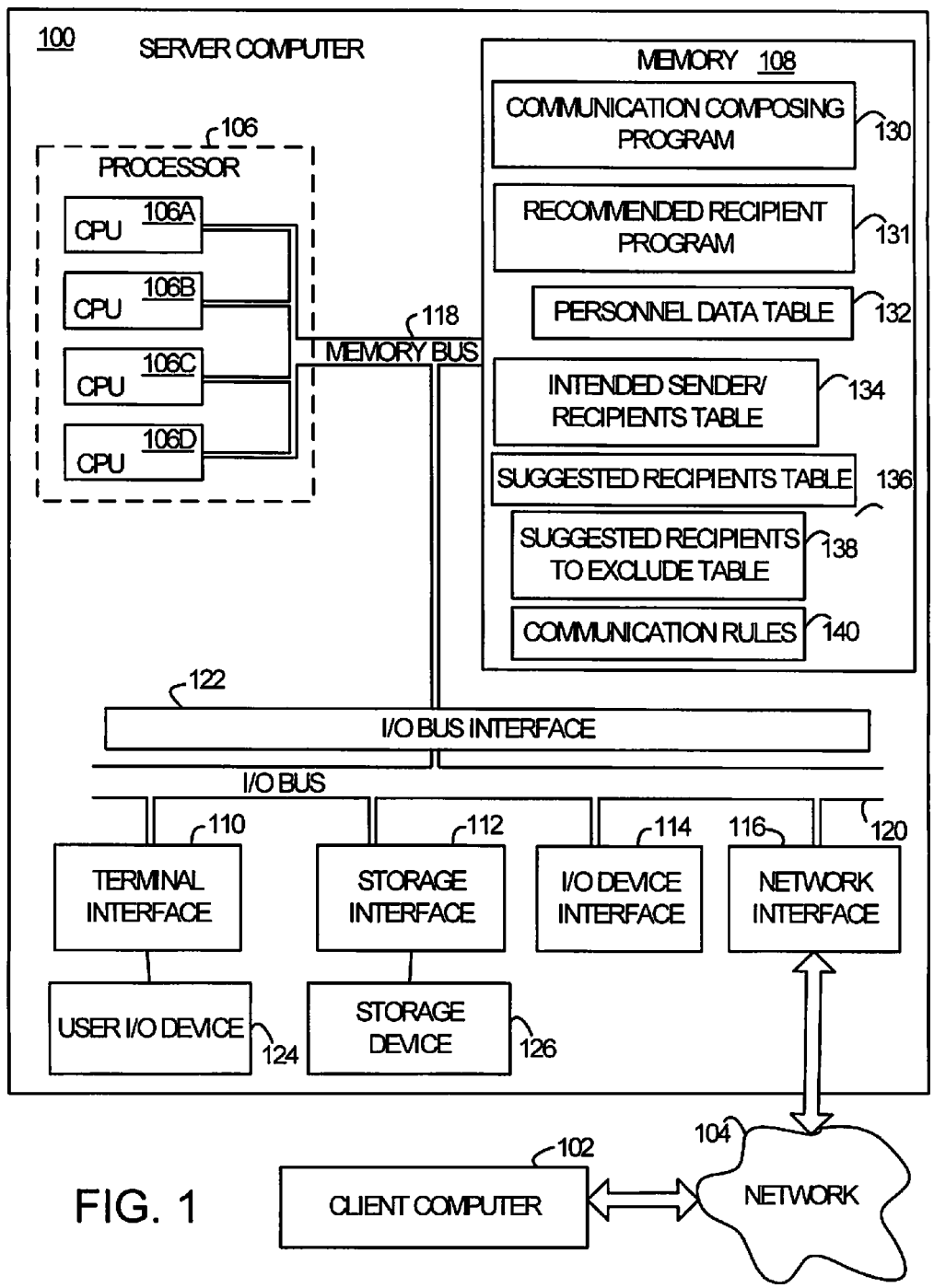
FIG. 1 depicts a high-level block diagram of an exemplary system for implementing an embodiment of the invention.

Referring to the drawings, wherein like numbers denote like parts throughout the several views, FIG. 1 depicts a high-level block diagram representation of a server computer system 100 connected to a client computer system 102 via a network 104, according to an embodiment of the present invention. The terms "server" and "client" are used herein for convenience only, and in various embodiments a computer system that operates as a client computer in one environment may operate as a server computer in another environment, and vice versa. The mechanisms and apparatus of embodiments of the present invention apply equally to any appropriate computing system, including a computer system that does not employ the client-server model.

The major components of the computer system 100 may include one or more processors 106, a main memory 108, a terminal interface 110, a storage interface 112, an I/O (Input/

Output) device interface 114, and a network interface 116, all of which may be communicatively coupled, directly or indirectly, for inter-component communication via a memory bus 118, an I/O bus 120, and an I/O bus interface unit 122.

The computer system 100 may contain one or more general-purpose programmable central processing units (CPUs) 106A, 106B, 106C, and 106D, herein generically referred to as the processor 106. In an embodiment, the computer system 100 may contain multiple processors typical of a relatively large system; however, in another embodiment the computer system 100 may alternatively be a single CPU system. Each processor 106 may execute instructions stored in the main memory 108 and may include one or more levels of on-board cache.

In an embodiment, the main memory 108 may include a random-access semiconductor memory, storage device, or storage medium (either volatile or non-volatile) for storing or encoding data and programs. In another embodiment, the main memory 108 may represent the entire virtual memory of the computer system 100, and may also include the virtual memory of other computer systems coupled to the computer system 100 or connected via the network 104. The main memory 108 may be conceptually a single monolithic entity, but in other embodiments the main memory 108 may be a more complex arrangement, such as a hierarchy of caches and other memory devices.

The main memory 108 may store or encode a communication composing program 130, a recommended recipient program 131, a personnel data table 132, an intended sender/recipients table 134, a suggested recipients table 136, a suggested recipients to exclude table 138, and communication rules 140, and are hereafter collectively referred to as "memory elements." Although the memory elements are illustrated as being contained within the memory 108 in the computer system 100, in other embodiments some or all of them may be on different computer systems and may be accessed remotely, e.g., via the network 104. The computer system 100 may use virtual addressing mechanisms that allow the programs of the computer system 100 to behave as if they only have access to a large, single storage entity instead of access to multiple, smaller storage entities. Thus, while the memory elements are illustrated as being contained within the main memory 108, these elements are not necessarily completely contained in the same storage device at the same time. Further, although the memory elements are illustrated as being separate entities, in other embodiments some of them, portions of some of them, or all of them may be packaged together.

In an embodiment, the memory elements may include instructions or statements that execute on the processor 106 or instructions or statements that may be interpreted by instructions or statements that execute on the processor 106, to carry out the functions as further described below with reference to FIGS. 2, 3A, 3B, 3C, 4, and 5. In another embodiment, the memory elements, or two or more of these elements may be implemented in hardware via semiconductor devices, chips, logical gates, circuits, circuit cards, other physical hardware devices, or a combination of these devices in lieu of, or in addition to, a processor-based system. In an embodiment, the memory elements, or two or more of these elements may include data in addition to instructions or statements.

The memory bus 118 may provide a data communication path for transferring data among the processor 106, the main memory 108, and the I/O bus interface 122. The I/O bus interface 122 may be further coupled to the I/O bus 120 for transferring data to and from the various I/O units. The I/O bus interface unit 122 communicates with multiple I/O interface units 110, 112, 114, and 116, which may also be known as I/O processors (IOPs) or I/O adapters (IOAs), through the I/O bus 120.

The I/O interface units support communication with a variety of storage and I/O devices. For example, the terminal interface unit 110 supports the attachment of one or more user I/O devices 124, which may include user output devices (such as a video display device, speaker, or television set) and user input devices (such as a keyboard, mouse, keypad, touchpad, trackball, buttons, light pen, or other pointing device). A user may manipulate the user input devices utilizing a user interface, in order to provide input data and commands to the user I/O device 124 and the computer system 100, and may receive output data via the user output devices. For example, a user interface may be presented via the user I/O device 124, such as displayed on a display device, played via a speaker, or printed via a printer.

The storage interface 112 supports the attachment of one or more disk drives or direct access storage devices 126 (which are typically rotating magnetic disk drive storage devices, although they could alternatively be other storage devices, including arrays of disk drives configured to appear as a single large storage device to a host computer). In another embodiment, the storage device 126 may be implemented via any type of secondary storage device. The contents of the main memory 108, or any portion thereof, may be stored to and retrieved from the storage device 126 as needed. The I/O device interface 114 may provide an interface to any of various other input/output devices or devices of other types, such as printers or fax machines. The network interface 116 may provide one or more communication paths from the computer system 100 to other digital devices and computer systems 102; such paths may include, e.g., one or more networks 104.

FIG. 2 depicts a block diagram of an example data structure for a personnel data table 132, according to an embodiment of the invention. The personnel data table may be generated by the recommended recipient program 131. In embodiments of the invention, the recommended recipient program 131 and the communication composing program 130 may be the same program, and in other embodiments they may be separate programs. The personnel data table 132 may include example records 202, 204, 206, 208, 210, 212, 214, 216, 218, 220, and 222, shown as rows in the table. Each record may include a name field 224, an email field 226, a title field 228, a report to chain field 230, a same manager field 232, an extended relationship field 234, a people managed field, 236, a groups field 238, and a certifications field 240. Each record may represent an individual employee within an organization. An organization may be a company, a government agency, a club, an association, or any other similar entity containing members or employees. The information contained in the fields may represent attributes of the employees or members of the organization. This information may be received from any organizational source. For example, some of the information may be received from an organizational chart database that illustrates the structure of the organization and the relationships and relative ranks of its employees. Information may also be received from human resources records, and other information may be received from users of the communication composing program 130 or the recommended recipient program 131. Information may also be received from past communications. For example, metadata related to a particular sender's past communication patterns may be gleaned and stored within the personal data table 132. In other embodiments, organizational information may be received from more than one organization. For example, members of two or more companies may be involved in a joint venture or they may be part of a government standards committee. In those embodiments, it may be necessary to normalize the received information. For example, an organization may refer to managers as "managers" while another organization may refer to managers as "supervisors." This may require a normalization of the terms used to refer to attributes in order to make them operative.

The name field 224, in each record, may identify the name of the person to which the personnel data applies. The email field 226 may identify the email address of the person to which the personnel data applies. The title field 228 may identify the job title of the person to which the personnel data applies. For example, a title 228 may be an engineer, a manager, a president or any other title associated with an employee or member of an organization. The report to chain field 230 may identify the direct chain of command to which each employee reports. For example, for record 210, the person known as "E" may have a manager, or may report directly to, the person known as "B," while "B" may have a manager known as "A." The same manager field 232 may identify all persons who have the same manager as the person for which the record applies. For example, for record 210, "E" and "F" may have the same manager, "B." The extended relationship field 234 may identify relationships among organizational members other than those represented by other fields. For example, for record 210, "E" may receive business guidance from "K," but "E" and "K" have no managerial relationship, therefore the business relationship between them may be defined as an extended relationship.

The people managed field 236 may identify all persons who directly report to the person for which the record applies. For example, for record 204, "B" is the direct manager of "E" and "F." The groups field 238 may identify all groups within the organization to which the person belongs. For example, a group designated as "POWER" may be a group that may be developing a system for generating power, and the members of the "POWER" group may be "E," "J," and "K," therefore, each group member may have the "POWER" designation present in the groups field 238. The certifications field 240 may identify all certifications a person holds. For example, if a person is certified with respect to United States government regulations that control the export and import of defense-related articles and services, then that person may be eligible to receive an International Traffic in Arms Regulations (ITAR) communication. Other certifications may include persons eligible to receive legal content, persons eligible to receive classified information, or any other certifications which may be used by an organization.

The tables of FIGS. 3A, 3B, and 3C may be referred to as a recommended recipient program table set, and may be created or reset and repopulated for each individual communication received by the recommended recipient program 131. If the recommended recipient program table set is created for each communication, the recommended recipient program 131 may store each recommended recipient program table set within the memory 108 along with a copy of the communication. If the recommended recipient program table set is reset and repopulated for each communication, the recommended recipient program 131 may store a single recommended recipient program table set within the memory 108 and change the quantity and value of each record within the recommended recipient program table set upon receipt of a new communication by the recommended recipient program 131.

FIG. 3A depicts a block diagram of an example data structure for an intended sender/recipients table 134, according to an embodiment of the invention. The intended sender/recipients table 134 may include example records 302, 304, 306, and 308, shown as rows in the table. Each record may include a name field 224 and a sender or receiver field 310. A user may generate a communication with the communication composing program 130 and within the communication the user may designate one or more people as intended recipients of the communication. For example, a user may write an email and address the email by entering names or email addresses into the "To:," "Cc:," or "Bcc:" fields. The communication may be conveyed to the recommended recipient program 131 which may generate the intended sender/recipients table 134 by creating a record for the sender and each recipient. The sender or receiver field 310 may identify whether each person is a recipient of the communication or the sender of the communication. For example, as in FIG. 3A, if "F" is the sender of an email, the received sender/recipients table may contain record 302 which contains an "S" in the S or R field 310 to show that "F" is the sender. The recommended recipient program 131 may also enter the names in the name filed 224 as program pointers, as designated by the caret symbol, which refer back to the record of the same name of the personnel data table 132.

FIG. 3B depicts a block diagram of an example data structure for a suggested recipients table 136, according to an embodiment of the invention. The suggested recipients table 136 may include example records 304, 312, 314, 316, 318, 306, 320, and 308, shown as rows in the table. Each record may include a name field 224. As in FIG. 3A, each record may contain a name in the name field 224 entered as a program pointer, as designated by the caret symbol, which may point back to the record of the same name of the personnel data table 132. Each record may represent an individual from the organization that the recommended recipient program 131 has determined should be a recipient of the communication. This determination may include the recommended recipient program 131 applying a set of communication rules 140 to the information contained in the intended sender/recipients table 134. The set of communication rules 140 may include global rules that apply to all senders or users of the recommended recipient program 131 or all members of a particular organization or all employees of a particular company. The set of communication rules 140 may also include local rules that may only apply to communications from a particular sender or user of the recommended recipient program 131 or particular members of a group. The set of communication rules 140 may also be determined by a manager, a program administrator, an individual user, or anyone else with similar permissions to determine the set of communication rules 140. A communication rule may also be set by an individual user for a unique or non-standard relationship defined by the individual. For example, the individual may define an informal group, such as a softball team.

The set of communication rules 140 may include any number of rules directed to determining recommended recipients of the communication. For example, a communication rule may be directed to sending the communication to all levels of a report to chain. This rule may suggest that if a user intends to send a communication to the manager of the user's manager, then the user should also include the user's manager as a recipient. For example, as in FIG. 3A, if "F" intends to send an email to "A," then "F" should also include "B" as a recipient because "B" is within the report to chain between "F" and "A," therefore, in FIG. 3B, the recommended recipient program 131 may add the example record 312 for "B" to indicate "B" as a suggested recipient of the communication. The rule directed to sending the communication to all levels of a report to chain may also suggest that if a user intends to send a communication to the manager of a recipient's manager, then the user should also include the recipient's manager as a recipient. For example, as in FIG. 3A, if "F" intends to send an email to "G" and "A," then "F" should also include "C" as a recipient because "C" is within the report to chain between "G" and "A," therefore in FIG. 3B, the recommended recipient program 131 may add the example record 314 for "C" to indicate "C" as a suggested recipient of the communication. The example record 316 for "D" is also added as a suggested recipient due to the application of this rule.

Another communication rule may be directed to sending the communication to all members of a group. This rule may suggest that if a user intends to send a communication to one or more members of a group then the user should include all members of that group as recipients of the communication. For example, as in FIG. 3A, if "F" intends to send an email to "K," then "F" should also include "E" and "J" as recipients because "E" and "J" are, along with "K," members of the "POWER" group. Therefore in FIG. 3B the recommended recipient program 131 may add the example records 318 and 320 for "E" and "J" respectively to indicate "E" and "J" as suggested recipients of the communication. Along with the previously explained rules, the set of communication rules 140 may contain any number of other communication rules which may result in suggested recipients of a communication.

FIG. 3C depicts a block diagram of an example data structure for a suggested recipients to exclude table 138, according to an embodiment of the invention. The suggested recipients to exclude table 138 may include example records 304, 312, 316, 318, 320, and 308, shown as rows in the table. Each record may include a name field 224. As in FIG. 3A, each record may contain a name in the name field 224 entered as a program pointer, as designated by the caret symbol, which may point back to the record of the same name of the personnel data table 132. Each record may represent a recipient from the suggested recipients table 136 that the recommended recipient program 131 has determined should not be a recipient of the communication. As in FIG. 3B, this determination may include the recommended recipient program 131 applying a set of communication rules 140 to the information contained in the intended sender/recipients table 134. For example, a communication rule may be directed to sending the communication to only those recipients with one or more certifications. This rule may suggest that only persons who hold certifications related to certain content may receive communications containing that content. For example, if a communication contains content related to United States government regulations that control the export and import of defense-related articles and services, then any person who may be an intended recipient of that communication may be required to have International Traffic in Arms Regulations (ITAR) certification. For example, as in FIG. 3B, if the communication associated with the suggested recipients contains ITAR content then "A," "D," "E," "J," and "K" should be not be recipients because they do not have an ITAR certification. Therefore, in FIG. 3C, the recommended recipient program 131 may include the records 304, 316, 318 and 320, and 308 to indicate that "A," "D," "E," "J," and "K" should be excluded as recipients. Other certifications may include persons eligible to receive legal content, persons eligible to receive classified information, persons outside a company or organization if proprietary content, or any other certifications which may be used by an organization.

The set of communication rules 140 may also include any number of rules directed to determining recommended recipients of the communication or recommended recipients to exclude based on the content of the communication. For example, the certification rule previously explained may be applied to the particular content present in the communication. Application of a content based rule may require a search of the textual content of a communication in order to find key words. Examples of key words may be people's names, sensitive terms, legal terms, or any other similar textual content. The set of communication rules 140 may also include any number of rules directed to suggesting particular content to exclude or include in a communication. For example, if the communication includes legal content, a particular rule may suggest the inclusion of a statement that the content is subject to attorney-client privilege. The content may be present in a message body, a subject line, an attachment, or any other similar content area. Other examples of rules based on content may include rules directed to financial records, medical records, personal information, unannounced products, unannounced ship dates, policy, organizational names, or any other similar communication content.

Another communication rule may be directed to limiting a total number of recipients of the communication. This rule may limit the total number of recipients that may be included in a communication. For example, the rule may include a limit of twenty recipients. This may have the effect of limiting a communication from being sent to a large number of unintended recipients. For example, if a user inadvertently selects the "reply all" option for an email, or if a user inadvertently includes every member of an organization as recipients of the email. Along with the previously explained rules, the set of communication rules 140 may contain any number of other communication rules which may result in suggested persons to exclude as recipients of a communication.

In embodiments of the invention it may be possible for an organization member to be included on both the suggested recipients table 136 and recipients to exclude table 138. For example, as in FIG. 3B, "A" is included as a suggested recipient because of the report to chain rule as previously explained, but, as in FIG. 3C, "A" is also included as a suggested recipient to exclude because of the certification rule. In embodiments of the invention, it may be preferable to present this information to the user or sender of the communication and allow the user or sender to decide which rule is most preferable to adhere to, and therefore whether to include "A" as a recipient. In other embodiments, rules may be assigned priority over other rules. For example, if the report to chain rule has a higher priority than the certification rule, then "A" would remain as a suggested recipient and would be removed from the suggested recipients to exclude.

Figure 4:
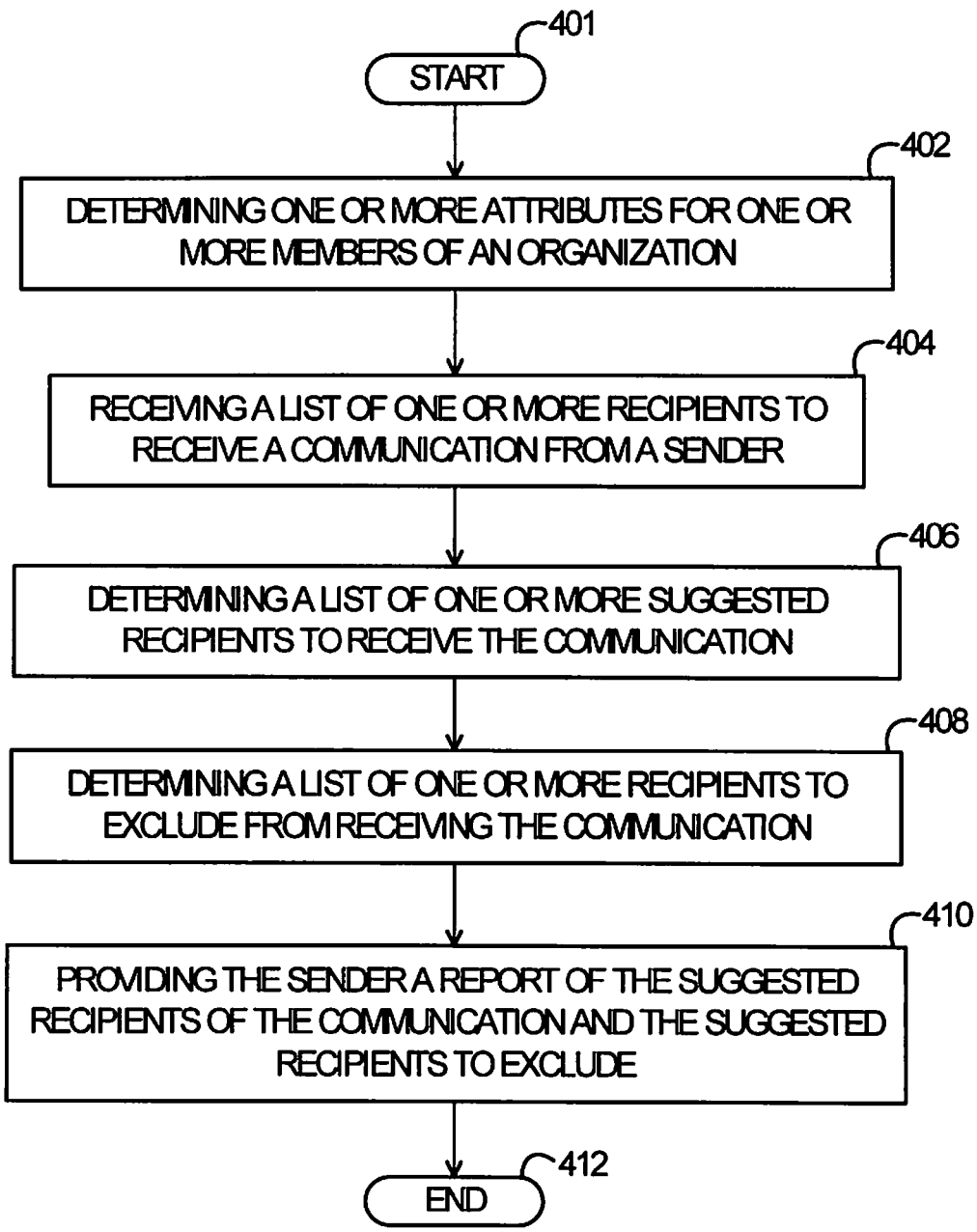
FIG. 4 depicts a block diagram of an example process for determining recommended recipients of a communication, according to an embodiment of the invention.

FIG. 4 depicts a block diagram of an example process for determining recommended recipients of a communication, according to an embodiment of the invention. The process may begin at block 401. Block 402 may contain the operation of determining one or more attributes for one or more members of an organization. As previously explained, these attributes may be determined from organizational information, and they may be stored in the personnel data table 132. Block 404 may contain the operation of receiving a list of one or more recipients to receive a communication from a sender. As previously explained, the recommended recipient program 131 may receive a list of recipients when a user generates a communication using a communication composing program 130, such as an email, and the user includes intended recipients. The intended recipients may be members of the organization from which the organizational information is received or they may be outside the organization. As previously explained, the intended sender/recipients table 134 may be generated using the received list of recipients.

Block 406 may contain the operation of determining a list of one or more suggested recipients to receive the communication. The suggested recipient list may include the suggested recipients table 136 and, as previously explained, may be determined by applying a set of communication rules 140 to the sender and intended recipients of the intended sender/recipients table 134. Block 408 may contain the operation of determining a list of one or more recipients to suggest for exclusion from receiving the communication. The suggested recipients to exclude list may include the suggested recipients to exclude table 138 and, as previously explained, may be determined by applying a set of communication rules 140 to the suggested recipients table 136. Block 410 may contain the operation of providing the sender a report of the suggested recipients of the communication and the suggested recipients to exclude. This may include the recommended recipient program 131 providing the report in the form of a visual display. For example, the recommended recipient program may display a message in the form of a warning to the sender of the communication. The process may end at block 412.

Figure 5:
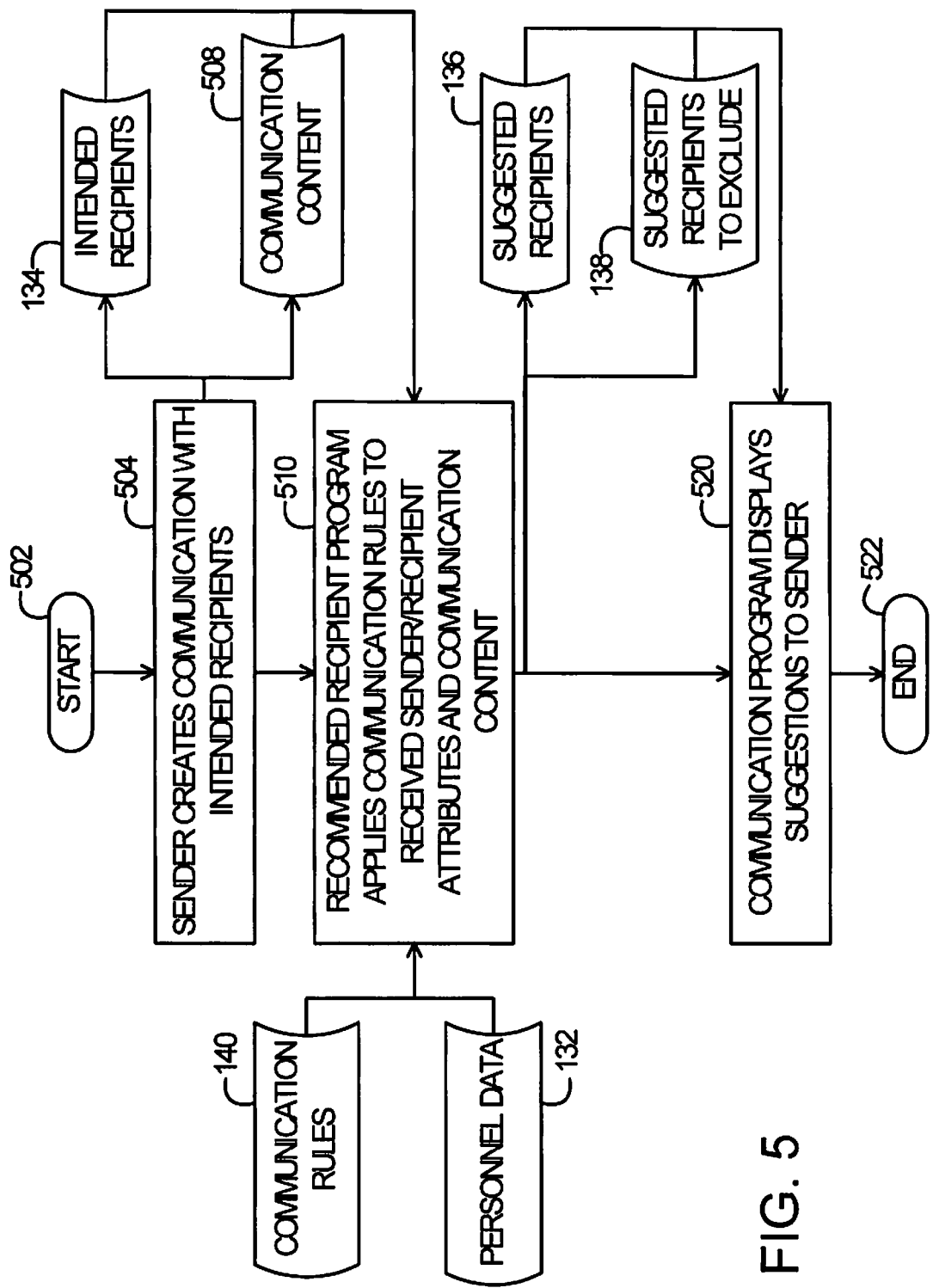
FIG. 5 depicts a flow chart of an example process for determining recommended recipients of a communication, according to an embodiment of the invention.

FIG. 5 depicts a flow chart of an example process for determining recommended recipients of a communication, according to an embodiment of the invention. Control may begin at block 502. Control may then proceed to block 504 where a sender may use a communication composing program 130 to create a communication, such as an email. Creating the communication may result in creating data for one or more intended recipients 134 and some form of communication content 508. At block 510, the recommended recipient program 131 may receive the intended recipient data 134 and the communication content 508, which may include text, figures, photos, files, or any other similar content. Also, the recommended recipient program may receive or may already have the communication rules 140 and the personnel data 132. The recommended recipient program 131 may apply the communication rules 140 to the communication content 508 and the personnel data 132 corresponding to the received intended recipients 134. The recommended recipient program 131 may output a list of suggested recipients 136 and a list of suggested recipients to exclude 138. Control may then proceed to block 520 where the recommended recipient program 131 displays the suggested recipients 136 and the suggested recipients to exclude 138 to the communication sender. Control may end at block 522.

Referring back to FIG. 1, in various embodiments, the computer system 100 may be a multi-user mainframe computer system, a single-user system, or a server computer or similar device that has little or no direct user interface, but receives requests from other computer systems (clients). In other embodiments, the computer system 100 may be implemented as a desktop computer, portable computer, laptop or notebook computer, tablet computer, pocket computer, telephone, smart phone, or any other appropriate type of electronic device.

The computer system 102 may include some or all of the hardware and/or computer program elements of the computer system 100. The various program components implementing various embodiments of the invention may be implemented in a number of manners, including using various computer applications, routines, components, programs, objects, modules, data structures, etc., and are referred to herein as "computer programs," or simply "programs."

The computer programs include one or more instructions or statements that are resident at various times in various memory and storage devices in the computer system 100 and that, when read and executed by one or more processors in the computer system 100, or when interpreted by instructions that are executed by one or more processors, cause the computer system 100 to perform the actions necessary to execute steps or elements including the various aspects of embodiments of the invention. Aspects of embodiments of the invention may be embodied as a system, method, or computer program product. Accordingly, aspects of embodiments of the invention may take the form of an entirely hardware embodiment, an entirely program embodiment (including firmware, resident programs, micro-code, etc., which are stored in a storage device), or an embodiment combining program and hardware aspects that may all generally be referred to herein as a "circuit," "module," or "system." Further, embodiments of the invention may take the form of a computer program product embodied in one or more computer-readable medium(s) having computer-readable program code embodied thereon.

Any combination of one or more computer-readable medium(s) may be utilized. The computer-readable medium may be a computer-readable signal medium or a computer-readable storage medium. For example, a computer-readable storage medium may be, but not limited to, an electronic, magnetic, optical, electromagnetic, infrared, or semiconductor system, apparatus, or device, or any suitable combination of the foregoing. More specific examples (an non-exhaustive list) of the computer-readable storage media may include: an electrical connection having one or more wires, a portable computer diskette, a hard disk, a random access memory (RAM), a read-only memory (ROM), an erasable programmable read-only memory (EPROM) or Flash memory, an optical fiber, a portable compact disc read-only memory (CD-ROM), an optical storage device, a magnetic storage device, or any suitable combination of the foregoing. In the context of this document, a computer-readable storage medium may be any tangible medium that can contain, or store, a program for use by or in connection with an instruction execution system, apparatus, or device.

A computer-readable signal medium may include a propagated data signal with computer-readable program code embodied thereon, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that communicates, propagates, or transports a program for use by, or in connection with, an instruction execution system, apparatus, or device. Program code embodied on a computer-readable medium may be transmitted using any appropriate medium, including but not limited to, wireless, wire line, optical fiber cable, Radio Frequency, or any suitable combination of the foregoing.

Computer program code for carrying out operations for aspects of embodiments of the present invention may be written in any combination of one or more programming languages, including object oriented programming languages and conventional procedural programming languages. The program code may execute entirely on the user's computer, partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of embodiments of the invention are described below with reference to flowchart illustrations and/or block diagrams of methods, apparatus (systems), and computer program products. Each block of the flowchart illustrations and/ or block diagrams, and combinations of blocks in the flowchart illustrations and/or block diagrams may be implemented by computer program instructions embodied in a computer-readable medium. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified by the flowchart and/or block diagram block or blocks. These computer program instructions may also be stored in a computer-readable medium that can direct a computer, other programmable data processing apparatus, or other devices to function in a particular manner, such that the instructions stored in the computer-readable medium produce an article of manufacture, including instructions that implement the function/act specified by the flowchart and/or block diagram block or blocks.

The computer programs defining the functions of various embodiments of the invention may be delivered to a computer system via a variety of tangible computer-readable storage media that may be operatively or communicatively connected (directly or indirectly) to the processor or processors. The computer program instructions may also be loaded onto a computer, other programmable data processing apparatus, or other devices to cause a series of operational steps to be performed on the computer, other programmable apparatus, or other devices to produce a computer-implemented process, such that the instructions, which execute on the computer or other programmable apparatus, provide processes for implementing the functions/acts specified in the flowcharts and/or block diagram block or blocks.

The flowchart and the block diagrams in the figures illustrate the architecture, functionality, and operation of possible implementations of systems, methods, and computer program products, according to various embodiments of the present invention. In this regard, each block in the flowcharts or block diagrams may represent a module, segment, or portion of code, which includes one or more executable instructions for implementing the specified logical function(s). In some embodiments, the functions noted in the block may occur out of the order noted in the figures. For example, two blocks shown in succession may, in fact, be executed substantially concurrently, or the blocks may sometimes be executed in the reverse order, depending upon the functionality involved. Each block of the block diagrams and/or flowchart illustration, and combinations of blocks in the block diagrams and/or flow chart illustrations, can be implemented by special purpose hardware-based systems that perform the specified functions or acts, in combinations of special purpose hardware and computer instructions.

Embodiments of the invention may also be delivered as part of a service engagement with a client corporation, non-profit organization, government entity, or internal organizational structure. Aspects of these embodiments may include configuring a computer system to perform, and deploying computing services (e.g., computer-readable code, hardware, and web services) that implement, some or all of the methods described herein. Aspects of these embodiments may also include analyzing the client company, creating recommendations responsive to the analysis, generating computer-readable code to implement portions of the recommendations, integrating the computer-readable code into existing processes, computer systems, and computing infrastructure, metering use of the methods and systems described herein, allocating expenses to users, and billing users for their use of these methods and systems. In addition, various programs described herein may be identified based upon the application for which they are implemented in a specific embodiment of the invention. But, any particular program nomenclature used herein is used merely for convenience, and thus embodiments of the invention are not limited to use solely in any specific application identified and/or implied by such nomenclature. The exemplary environments illustrated in FIG. 1 are not intended to limit the present invention. Indeed, other alternative hardware and/or program environments may be used without departing from the scope of embodiments of the invention.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of exemplary embodiments of the invention, reference was made to the accompanying drawings (where like numbers represent like elements), which form a part hereof, and in which is shown by way of illustration specific exemplary embodiments in which the invention may be practiced. These embodiments were described in sufficient detail to enable those skilled in the art to practice the invention, but other embodiments may be utilized and logical, mechanical, electrical, and other changes may be made without departing from the scope of the present invention. In the previous description, numerous specific details were set forth to provide a thorough understanding of embodiments of the invention. But, embodiments of the invention may be practiced without these specific details. In other instances, well-known circuits, structures, and techniques have not been shown in detail in order not to obscure embodiments of the invention.

Different instances of the word "embodiment" as used within this specification do not necessarily refer to the same embodiment, but they may. Any data and data structures illustrated or described herein are examples only, and in other embodiments, different amounts of data, types of data, fields, numbers and types of fields, field names, numbers and types of rows, records, entries, or organizations of data may be used. In addition, any data may be combined with logic, so that a separate data structure may not be necessary. The previous detailed description is, therefore, not to be taken in a limiting sense.

What is claimed is:

1. A method for directing a communication to recipients, comprising:
   determining one or more attributes for one or more members of a first group;
   determining one or more attributes for one or more members of a second group;
   normalizing the attributes of the first group members with the attributes of the second group members;
   receiving, from a sender of the communication, a first set of communication content and a first list of one or more recipients of the communication, wherein particular attributes define a relationship between the first list recipients and the sender;

determining, by analyzing the first set of communication content, a file size for the first set of communication content;

determining, based on the file size for the first set of communication content, a second list of one or more suggested recipients of the communication, wherein the second list of suggested recipients is determined by whether the attributes of the first list recipients, the sender, and the first group members comply with a set of communication rules;

parsing, in response to determining the second list of one or more suggested recipients to receive the communication, the first set of communication content; and suggesting, based on parsing the first set of communication content and the second list of one or more suggested recipients, a second set of communication content related to the first set of communication content for inclusion in the communication.

2. The method of claim 1, wherein the determination of the second list of suggested recipients includes identifying one or more first group members that are not included in the first list of recipients.

3. The method of claim 1, wherein the determination of the second list of suggested recipients includes identifying one or more first list recipients for exclusion from the second list of suggested recipients.

4. The method of claim 1, further comprising analyzing one or more content elements of the communication.

5. The method of claim 1, further comprising reporting the determination of the second list of suggested recipients.

6. A method for directing an email communication to recipients, comprising:

determining one or more attributes for one or more members of a first group;

determining one or more attributes for one or more members of a second group;

normalizing the attributes of the first group members with the attributes of the second group members;

receiving, from a user, a first set of communication content and a first list of one or more recipients to receive the email communication, wherein particular attributes define a relationship between the first list recipients and the user;

analyzing one or more content elements of the email communication;

determining, by analyzing the first set of communication content, a file size for the first set of communication content;

determining, based on the file size for the first set of communication content, a second list of one or more suggested recipients to receive the communication, wherein the second list of suggested recipients is determined by whether the attributes of the first list recipients, the user, and the first and second group members and the content elements comply with a set of communication rules;

parsing, in response to determining the second list of one or more suggested recipients to receive the communication, the first set of communication content; and suggesting, based on parsing the first set of communication content and the second list of one or more suggested recipients, a second set of communication content related to the first set of communication content for inclusion in the communication.

7. The method of claim 6, further comprising changing the content elements in order to comply with the set of communication rules.

8. A nontransitory computer readable storage medium having instructions stored thereon which, when executed, cause a processor to perform the following operations:

determining one or more attributes for one or more members of a first group;

determining one or more attributes for one or more members of a second group;

normalizing the attributes of the first group members with the attributes of the second group members;

receiving, from a sender of the communication, a first set of communication content and a first list of one or more recipients of the communication, wherein particular attributes define a relationship between the first list recipients and the sender;

determining, by analyzing the first set of communication content, a file size for the first set of communication content;

determining, based on the file size for the first set of communication content, a second list of one or more suggested recipients of the communication, wherein the second list of suggested recipients is determined by whether the attributes of the first list recipients, the sender, and the first group members comply with a set of communication rules;

parsing, in response to determining the second list of one or more suggested recipients to receive the communication, the first set of communication content; and suggesting, based on parsing the first set of communication content and the second list of one or more suggested recipients, a second set of communication content related to the first set of communication content for inclusion in the communication.

9. The method of claim 1, wherein the particular attributes that define the relationship between the first list recipients and the sender include an organizational position and a set of certifications.

10. The method of claim 1, wherein determining one or more attributes for one or more members of the first group includes:

parsing an organizational hierarchy table including personnel data for a first group of individuals; and identifying, in response to parsing the organizational hierarchy table including personnel data for the first group of individuals, the one or more attributes based on the personnel data.

11. The method of claim 10, further comprising:

identifying, in response to parsing the organizational hierarchy table including personnel data for a first group of individuals, a first subgroup of the first group of individuals, the first subgroup having a first certification; and excluding, from the second list of one or more suggested recipients, the first subgroup.

12. The method of claim 1, wherein the second list of one or more suggested recipients includes one or more individuals selected from the first group of individuals.

13. The method of claim 1, wherein normalizing the attributes of the first group members with the attributes of the second group members includes:

extracting a first semantic element corresponding to the first group members and a second semantic element corresponding to the second group members;

determining, using the first semantic element and the second semantic element, a shared attribute related to both the first group members and the second group members; and assigning, to the first group members and the second group members, the shared attribute.

14. The method of claim 1, further comprising:
collecting, in response to determining a second list of one or more suggested recipients of the communication, communication data;
assigning, based on analyzing the communication data, a first priority to a first communication rule of the set of communication rules and a second priority to a second communication rule of the set of communication rules.

15. The method of claim 13, further comprising:
identifying a conflict between the first communication rule and the second communication rule;
determining, by comparing the first priority of the first communication rule with the second priority of the second communication rule, that the first priority trumps the second priority; and
instantiating, in response to determining that the first priority trumps the second priority, the first communication rule.

16. The method of claim 1, further comprising excluding, based on the file size, a second subgroup from the second list of one or more suggested recipients.

17. The method of claim 1, further comprising filtering, based on parsing the first set of communication content and the second list of one or more suggested recipients, a portion of the first set of communication content from the communication.

18. The method of claim 10, further comprising:
identifying, in response to parsing the organizational hierarchy table including personnel data for a first group of individuals, a report chain for the first group of individuals, the report chain including a set of management levels;
determining, based on parsing the organizational hierarchy table including personnel data for a first group of individuals, a first management level of the set of management levels, wherein the first management level corresponds to the sender of the communication;
determining, in response to receiving the first list of one or more recipients of the communication, a second management level of the set of management levels, wherein the second management level corresponds to a first recipient of the first list of one or more recipients; and
suggesting, based on the first management level corresponding to the sender of the communication and the second management level corresponding to the first recipient, a second recipient corresponding to a third management level of the set of management levels.

* * * * *